United States Patent
Lin et al.

(10) Patent No.: US 7,982,329 B2
(45) Date of Patent: Jul. 19, 2011

(54) VERTICAL AXIS WIND GENERATOR STRUCTURE

(75) Inventors: Jung-Kuei Lin, Hsinchu (TW); Chien-Chiang Tung, Changhua County (TW); Yun-Yuan Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 326 days.

(21) Appl. No.: 12/356,746

(22) Filed: Jan. 21, 2009

(65) Prior Publication Data

US 2010/0133846 A1    Jun. 3, 2010

(30) Foreign Application Priority Data

Dec. 3, 2008  (TW) .................................. 97147023 A

(51) Int. Cl.
*F03D 9/00*  (2006.01)
(52) U.S. Cl. .......................................... 290/55; 290/44
(58) Field of Classification Search .............. 290/43–44, 290/54–55
See application file for complete search history.

(56) References Cited

U.S. PATENT DOCUMENTS

| | | | | |
|---|---|---|---|---|
| 4,134,707 A | * | 1/1979 | Ewers | 415/4.2 |
| 4,134,708 A | * | 1/1979 | Brauser et al. | 415/30 |
| 4,926,061 A | * | 5/1990 | Arreola, Jr. | 290/55 |
| 6,147,415 A | * | 11/2000 | Fukada | 290/55 |
| 6,798,082 B1 | * | 9/2004 | Chen | 290/55 |
| 7,400,052 B1 | * | 7/2008 | Badger | 290/1 A |
| 2007/0102938 A1 | | 5/2007 | Poole | |
| 2009/0167027 A1 | * | 7/2009 | Kato | 290/55 |

FOREIGN PATENT DOCUMENTS

TW            168238          9/1991

OTHER PUBLICATIONS

Roller Bearings Troubleshooter's Guide, Copyright 2000, Maintenance Resources Inc., pp. 1-4.*

* cited by examiner

*Primary Examiner* — Michael C Zarroli
(74) *Attorney, Agent, or Firm* — Rabin & Berdo, P.C.

(57) ABSTRACT

A vertical axis wind generator structure includes a tower, a windmill assembly, a bearing assembly, a lubrication assembly, and a generator. The windmill assembly is installed on the bearing assembly. The windmill assembly and the bearing assembly are rotatably sleeved on a shaft lever of the tower. The bearing assembly provides for thermal expansion compensation and axial and radial loading. The lubrication assembly supplies lubricating oil based on the operating conditions of the windmill assembly so as to prolong the lifespan and improve the electricity generation effect of the wind generator.

24 Claims, 12 Drawing Sheets

VERTICAL AXIS WIND GENERATOR STRUCTURE

CROSS-REFERENCE TO RELATED APPLICATIONS

This non-provisional application claims priority under 35 U.S.C. §119(a) on Patent Application No(s). 097147023 filed in Taiwan, R.O.C. on Dec. 3, 2008 the entire contents of which are hereby incorporated by reference.

BACKGROUND OF THE INVENTION

1. Field of Invention

The present invention relates to a wind generator, and more particularly to a vertical axis wind generator structure.

2. Related Art

A wind generator generates electric energy by driving a windmill to be rotated with the wind and driving the generator via the windmill. Depending on the relationship between the rotation axis of the windmill and the wind direction, the wind generator can further be classified as a horizontal axis wind generator in which the rotation axis of the windmill is horizontal with respect to the wind direction and a vertical axis wind generator in which the rotation axis of the windmill is vertical with respect to the wind direction. Horizontal axis wind generators are usually applied as large scale wind generators arranged in an open filed while vertical axis wind generators are usually applied as small scale wind generators arranged on top of large buildings.

In recent years, issues such as energy saving and environment protection have drawn considerable attention, which makes the demand for small scale wind generators increase. Arranging wind generators on top of large buildings can supply part of the electricity to public facilities in the building so as to achieve energy saving. However, several problems exist in small scale wind generators, for example, they are arranged on top of buildings, ambient temperature may vary, the wind generator mechanism has a poor endurance, the bearing has a poor lubrication, and the structure strength cannot be reinforced according to the install location. All of such problems have impacts on the lifespan of small scale wind generators, so that small scale wind generators have a high cost of implementation, which is unacceptable for proprietor of the buildings.

The Taiwan patent publication No. 168238 disclosed a vertical axis wind turbine blade construction and US patent publication No. 2007102938 disclosed a vertical wind turbine power generation system. In the two patents just mentioned, in order to enable the wind blade to be rotated smoothly, a fixed bearing, such as ball bearing or thrust bearing, is disposed between the rotation axis and the stationary shaft of the wind blade. The bearing is used for decreasing the frictional resistance in the rotation movement and thus has a direct impact on the rotation and lifespan of the wind blade.

Depending on the practical operation conditions of the wind generator, the direction of the air flow driving the wind blade to be rotated is not fixed. Particularly, if the wind generator is arranged on top of a building, the air flow comes from all directions, such as a lateral air flow, upward air flow, or downward air flow, the ball bearing or thrust bearing conventionally used between the rotation axis and the stationary shaft cannot withstand the forces from all the directions. Furthermore, the temperature resulting from the rotation movement of the rotation axis or the ambient temperature would also impact the lifespan of the bearing. The variations in the operation or the environment cannot be overcome simply by decreasing the frictional resistance via the bearing. Further, if the bearing breaks down, it is not easy to repair or replace the wind generator arranged on top of a building, thus leading to an increased maintenance cost.

SUMMARY OF THE INVENTION

Conventional vertical axis wind generator mechanism has a poor endurance and a poor lubrication in the bearing, which impacts its lifespan. In view of this, the present invention provides a vertical axis wind generator structure with an increased lifespan.

The vertical axis wind generator structure according to the present invention includes a tower, a windmill assembly, a bearing assembly, a lubrication assembly, and a generator. A shaft lever stands upright on the tower. The windmill assembly is installed on the bearing assembly. The windmill assembly and the bearing assembly are rotatably installed on the shaft lever. The bearing assembly includes an upper shaft sleeve and a lower shaft sleeve. A floating bearing is disposed in the upper shaft sleeve and a fixed bearing is disposed in the lower shaft sleeve. The lubrication assembly supplies lubricating oil needed by the floating bearing and the fixed bearing. The lower shaft sleeve is connected to the generator via a shaft coupling. A plurality of blades in the windmill assembly can be rotated by blowing air flow, thereby driving the generator to be rotated to generate electric energy. The vertical axis wind generator structure according to the present invention further includes a truss assembly, which can be installed on the tower depending on the wind load and the erection height.

In the vertical axis wind generator structure according to the present invention, the floating bearing and the fixed bearing provides for thermal expansion compensation and axial and radial loading. The lubrication assembly supplies the floating bearing and the fixed bearing with lubricating oil as desired, depending on the operation conditions of the windmill assembly. In this way, the lifespan of the floating bearing and the fixed bearing is extended, thereby improving the electricity generation effect of the wind generator. Therefore, the vertical axis wind generator structure according to the present invention is an optimum vertical axis wind generator structure.

Detailed features and implementation of the present invention will be described in details in the following detailed description in conjunction with drawings, the content of which enables those skilled in related arts to understand the technical solution of the present invention and implement the present invention accordingly. Through the disclosure and drawings in the specification, those skilled in related arts can readily understand relevant objectives and advantages of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The vertical axis wind generator structure according to the present invention generates rotational kinetic energy through wind to be converted into electric energy. The so-called vertical axis means that the rotation axis of the windmill assembly is vertical with respect to the wind direction. As the conversion mode of wind electricity generation is already known, the wind generator will be referred to as a generator in the embodiments below.

Figure 1:
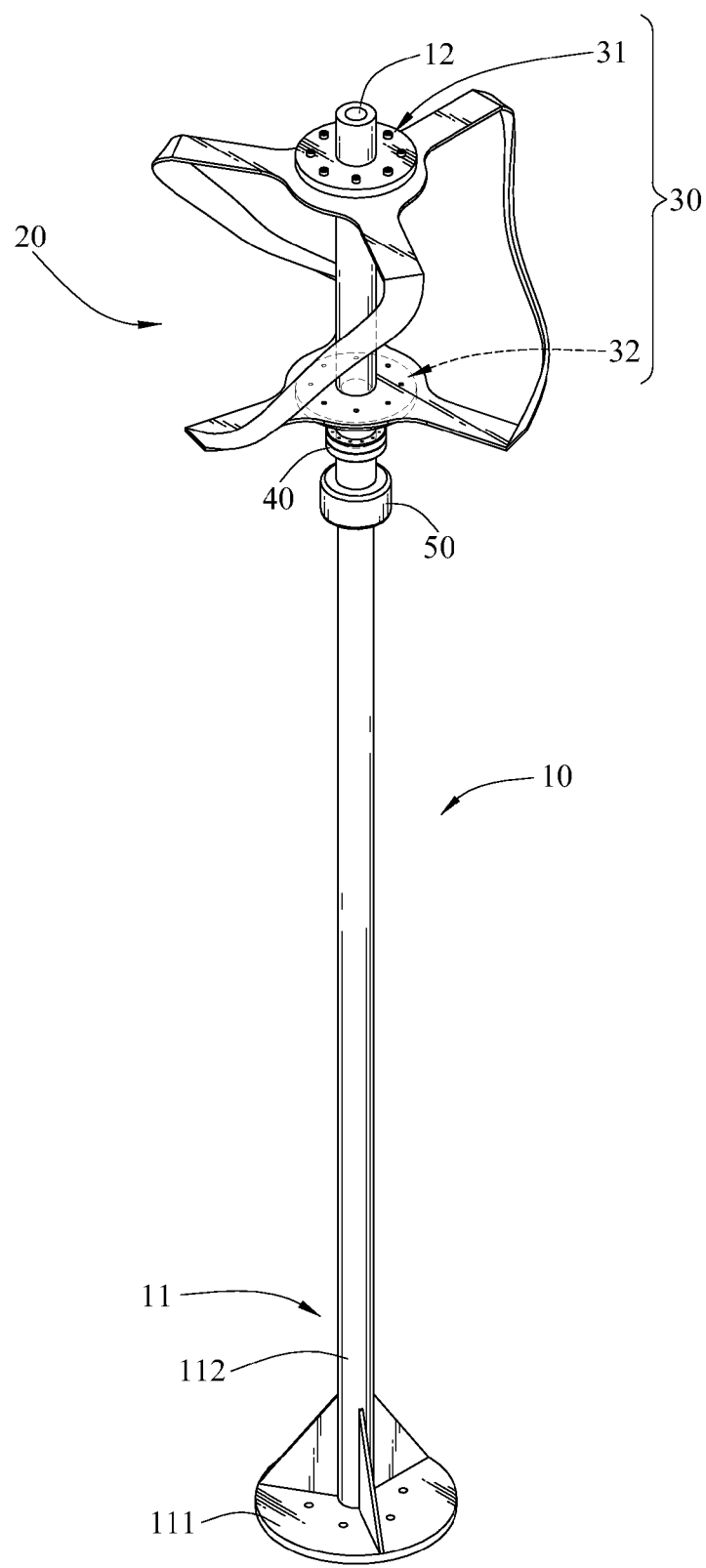
FIG. 1 is an assembly drawing of the structure according to a first embodiment the present invention.
Figure 2:
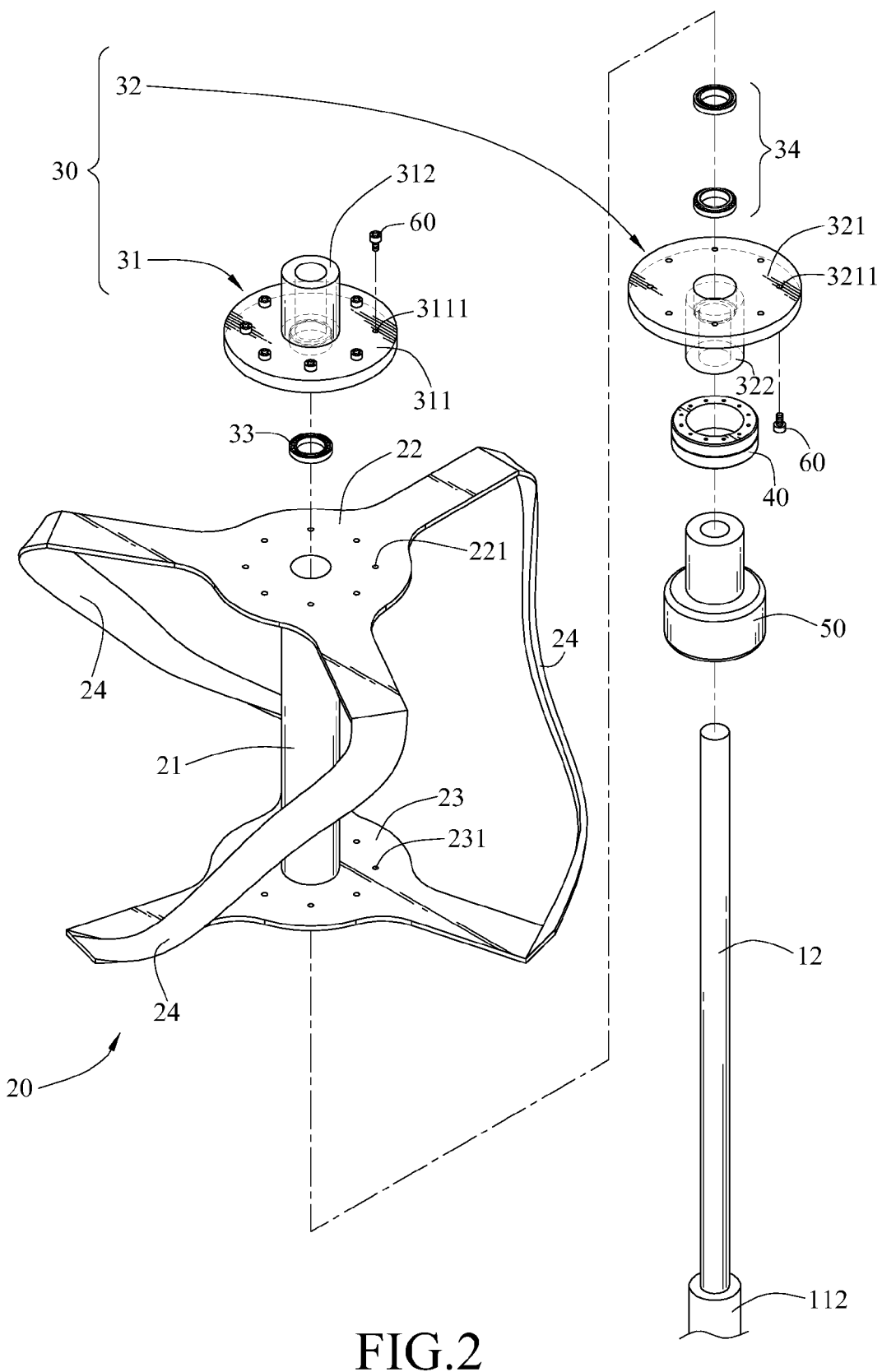
FIG. 2 is an exploded view of the structure according to the first embodiment of the present invention.

Referring to FIGS. 1 and 2, a first embodiment of the vertical axis wind generator structure according to the present invention is shown. The structure includes a tower 10, a windmill assembly 20, a bearing assembly 30, a shaft coupling 40, and a generator 50.

The tower 10 includes a bracket 11 and a shaft lever 12. The bracket 11 includes a base 111 and a support tube 112. The base 111 can be arranged on an install location (not shown) such as the roof. The support tube 112 is a hollow tube body. The shaft lever 12 stands at the top end of the support tube 112. The shaft lever 12 may also be a hollow tube body.

The windmill assembly 20 includes a tubular portion 21, a top plane 22, a bottom plane 23, and a plurality of blades 24. The tubular portion 21 is a hollow tube body with an inner diameter greater than an outer diameter of the shaft lever 12. The top plane 22 and the bottom plane 23 extend horizontally from the top end and bottom end of the tubular portion 21 respectively. A plurality of through holes 221 and 231 are arranged in the top plane 22 and the bottom plane 23. The plurality of blades 24 extend from the top plane 22 and the bottom plane 23. The number and form of the blades 24 may vary depending on the condition of the wind field in the install environment. For example, the number of the blades 24 may be two or three, or the curved surface under wind load of the blade 24 may have various geometries.

Figure 3A:
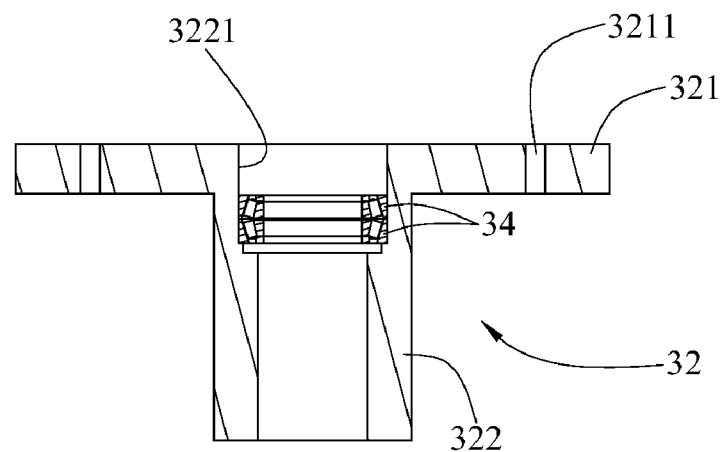
FIGS. 3A and 3B are sectional views of parts of the structure according to the first embodiment of the present invention.
Figure 3B:
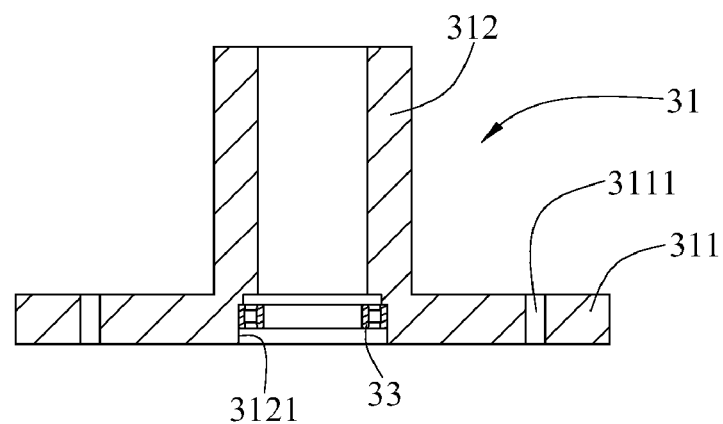

As shown in FIGS. 3A and 3B, the bearing assembly 30 includes an upper shaft sleeve 31, a lower shaft sleeve 32, a floating bearing 33 installed in the upper shaft sleeve 31, and a fixed bearing 34 installed in the lower shaft sleeve 32. The upper shaft sleeve 31 and the lower shaft sleeve 32 each has a joining plane 311 and 321, and a bushing 312 and 322. The joining plane 311 and 321 includes a plurality of joining holes 3111 and 3211 corresponding to the plurality of through holes 221 and 231 in the top plane 22 and the bottom plane 23. The bushings 312 and 322 are hollow tube bodies extending upright from the joining planes 311 and 321. The inner diameter of the bushings 312 and 322 is greater than the outer diameter of the shaft lever 12. The bushings 312 and 322 include a bearing portion 3121 and 3221 therein for receiving the floating bearing 33 and the fixed bearing 34 respectively.

The floating bearing 33 is a roller bearing and the fixed bearing 34 is a pair of rolling cone bearings or angular contact ball bearings. The floating bearing 33 is of NU-type and the inner ring and outer ring thereof can move axially with respect to each other to provide thermal expansion compensation. The pair of rolling cone bearings or angular contact ball bearings has a gradient and is arranged facing each other to provide a force withstanding capability in both an axial direction and a radial direction.

Figure 4:
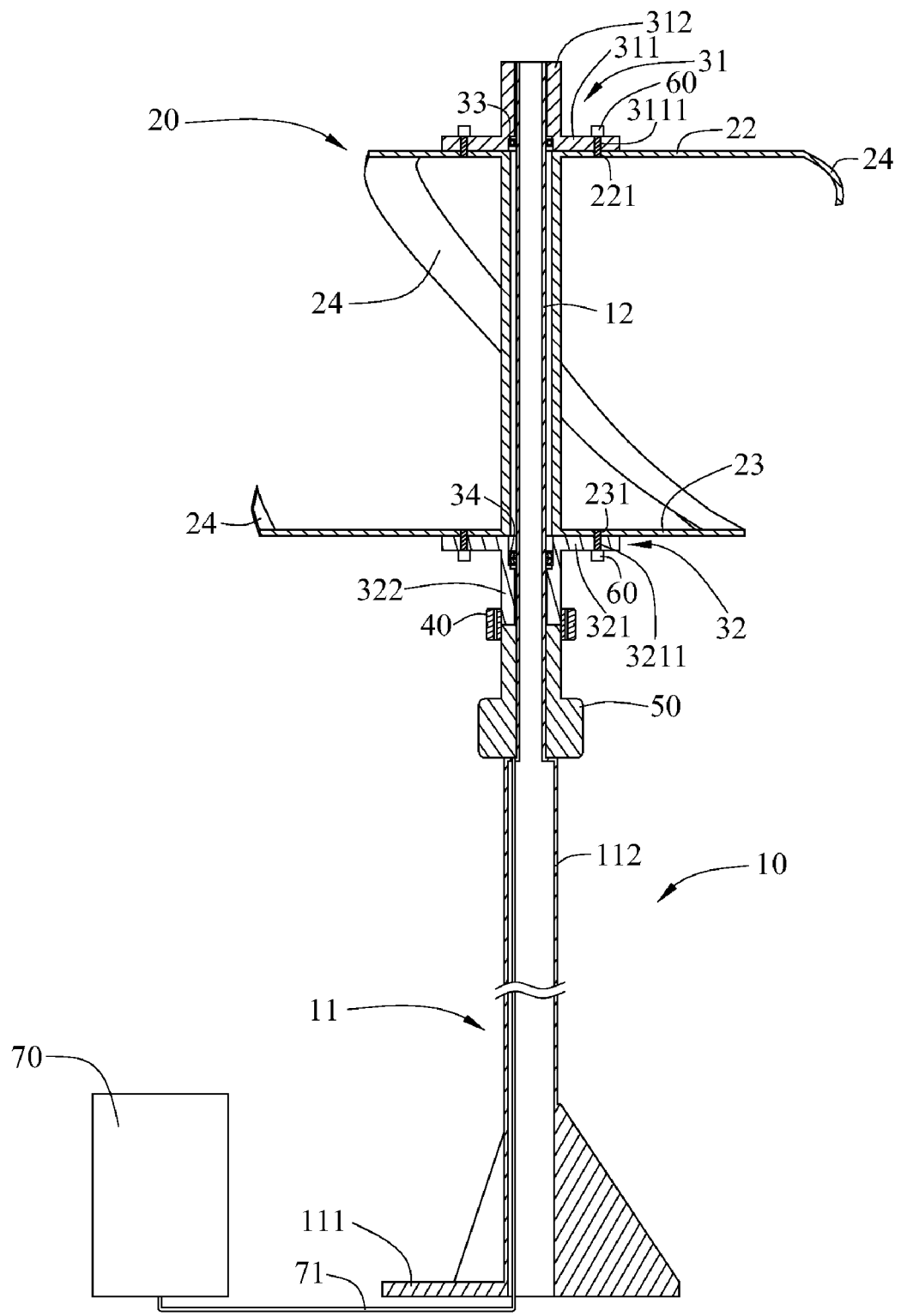
FIG. 4 is an application view according to the first embodiment of the present invention.

Also referring to FIG. 4, a first embodiment of the vertical axis wind generator structure according to the present invention is shown. The windmill assembly 20 is installed on the bearing assembly 30. The upper shaft sleeve 31 and the lower shaft sleeve 32 in the bearing assembly 30 are respectively installed to the top plane 22 and bottom plane 23 of the windmill assembly 20 by the joining planes 311 and 321 thereof. The joining holes 3111 and 3211 in the joining planes 311 and 321 correspond to the through holes in the top plane 22 and the bottom plane 23 and are further fastened by a plurality of bolts 60, so that the upper shaft sleeve 31 and the lower shaft sleeve 32 are joined and fixed to the top plane 22 at the top end and the bottom plane 23 at the bottom end of the windmill assembly 20. The tower 10 is arranged in the install location (not shown), with the shaft lever 12 standing upright at the top end of the bracket 11 of the tower 10, the shaft coupling 40 joined to a rotator (not shown) of the generator 50, and the shaft coupling 40 and the generator 50 being sleeved in from the shaft lever 12 and installed at the top end of the bracket 11. Subsequently, the tubular portion 21 of the windmill assembly 20 and the bearing assembly 30 is sleeved in with the bushing 312 and 322, the lower shaft sleeve 32 and the shaft coupling 40 are joined, and the inner rings of the floating bearing 33 and the fixed bearing 34 within the upper shaft sleeve 31 and the lower shaft sleeve 32 are sleeved on the shaft lever 12, so that the windmill assembly 20 and the bearing assembly 30 are rotatably installed on the shaft lever 12. The plurality of blades in the windmill assembly 20 can be rotated by blowing an air flow and thereby drive the generator 50 to be rotated to generate electric energy. The generator 50 is connected to an electric box 70 beside the tower 10 through a connection wire 71 inside the support tube 11. The electric box 70 can store electric energy and obtain the working parameters of operation, such as rotation speed and temperature, of the generator 50.

In the first embodiment of the vertical axis wind generator structure according to the present invention, depending on the operation condition of the vertical axis wind generator actually set, such as axial load or radial load possibly due to air flow from all directions, or variation in ambient temperature, the floating bearing 33 and the fixed bearing 34 provides thermal expansion compensation and axial and radial loading capabilities, i.e., provides for a smooth operation of the windmill assembly 20 and the bearing assembly 30, so as to enhance the electricity generation efficiency of the generator 50.

Figure 5:
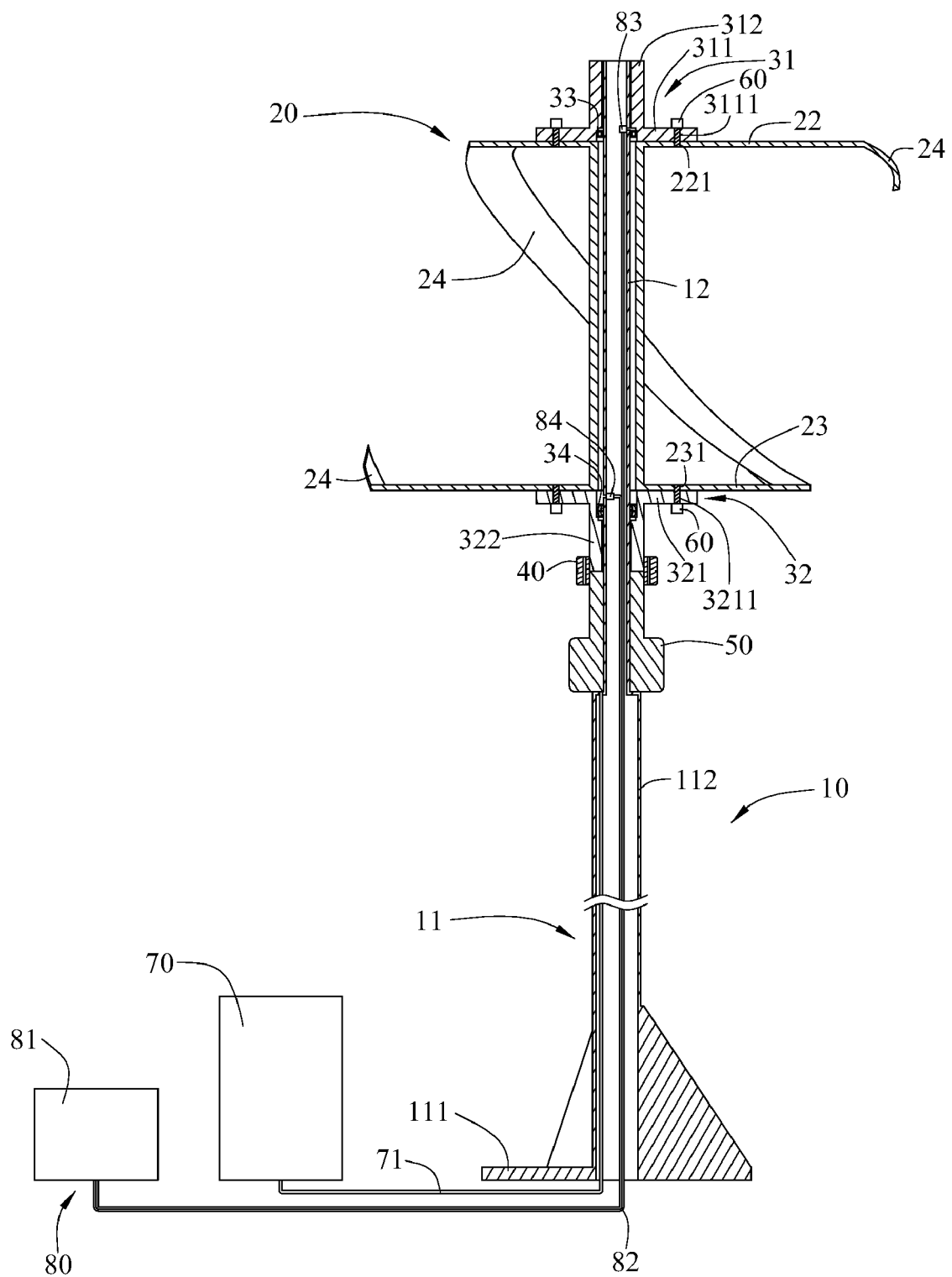
FIG. 5 is an assembly drawing of the structure according to a second embodiment of the present invention.
Figure 6A:
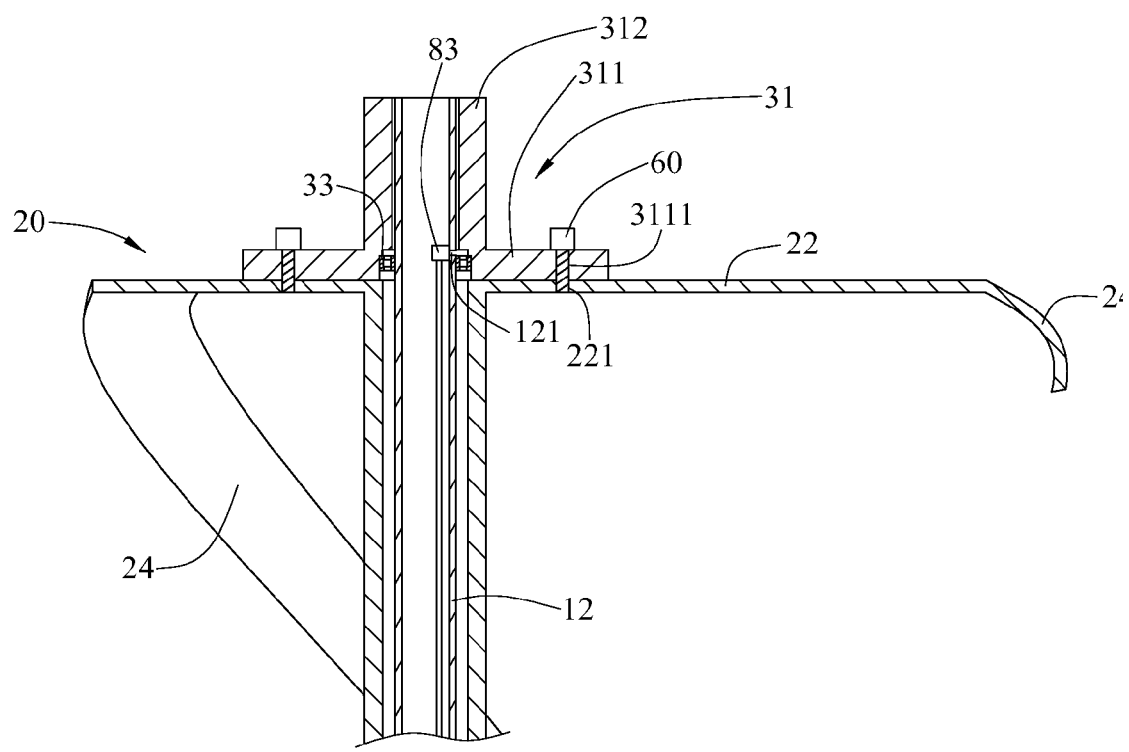
FIGS. 6A and 6B are sectional views of parts of the structure according to the second embodiment of the present invention.
Figure 6B:
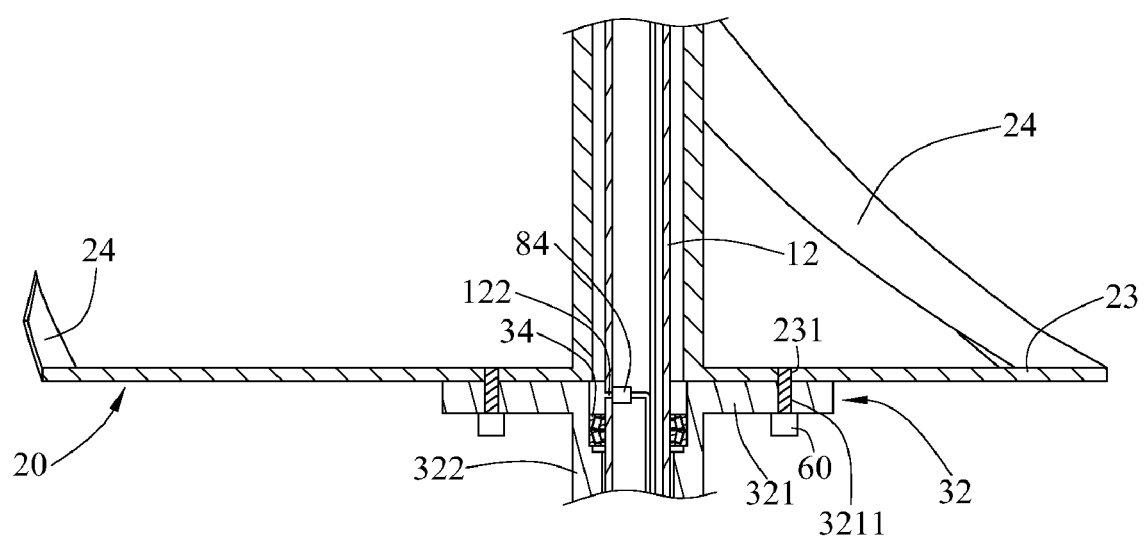

Referring to FIGS. 5, 6A, and 6B, a second embodiment of the vertical axis wind generator structure according to the present invention is shown. In order to prolong the lifespan of the bearing assembly 30, the second embodiment of the present invention further includes a lubrication assembly 80. In the second embodiment, an upper oil inlet 121 and a lower oil inlet 122 are arranged in the shaft lever 12 at a location corresponding to the floating bearing 33 and the fixed bearing 34. The lubrication assembly 80 according to the second embodiment of the present invention includes an oil tank 81, an oil pipe 82, and an upper feeding element 83, and a lower feeding element 84. The oil tank 81 is controlled by the electric box 70 and charged with lubricating oil. The oil pipe 82 is connected to the oil tank 81 at one end and connected to the upper feeding element 83 and the lower feeding element 84 at the other end. The upper feeding element 83 and the lower feeding element 84 are control valves and respectively installed in the upper oil inlet 121 and the lower oil inlet 122. The oil pipe 82 is arranged in the support tube 112 and the shaft lever 12 of the tower 10. Based on the working parameters of operation, such as rotation speed and temperature, of the generator 50, the electric box 70 controls the lubrication assembly 80, and supplies the lubricating oil to the floating bearing 33 and the fixed bearing 34 as desired in order to prolong the lifespan of the floating bearing 33 and the fixed bearing 34 as well as enhance the electricity generation effect of the generator 50.

Figure 7A:
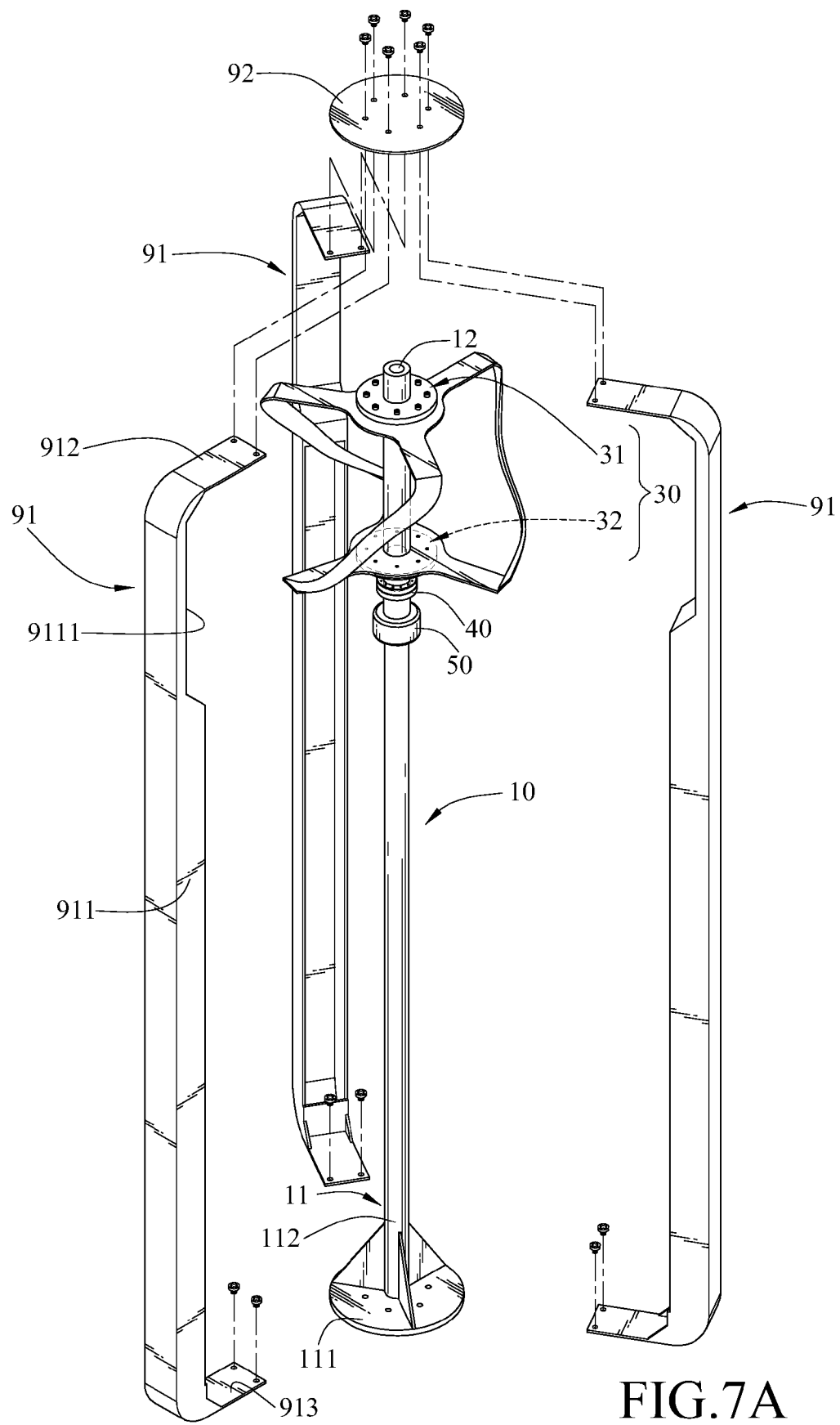
FIGS. 7A and 7B show the structure according to a third embodiment of the present invention.
Figure 7B:
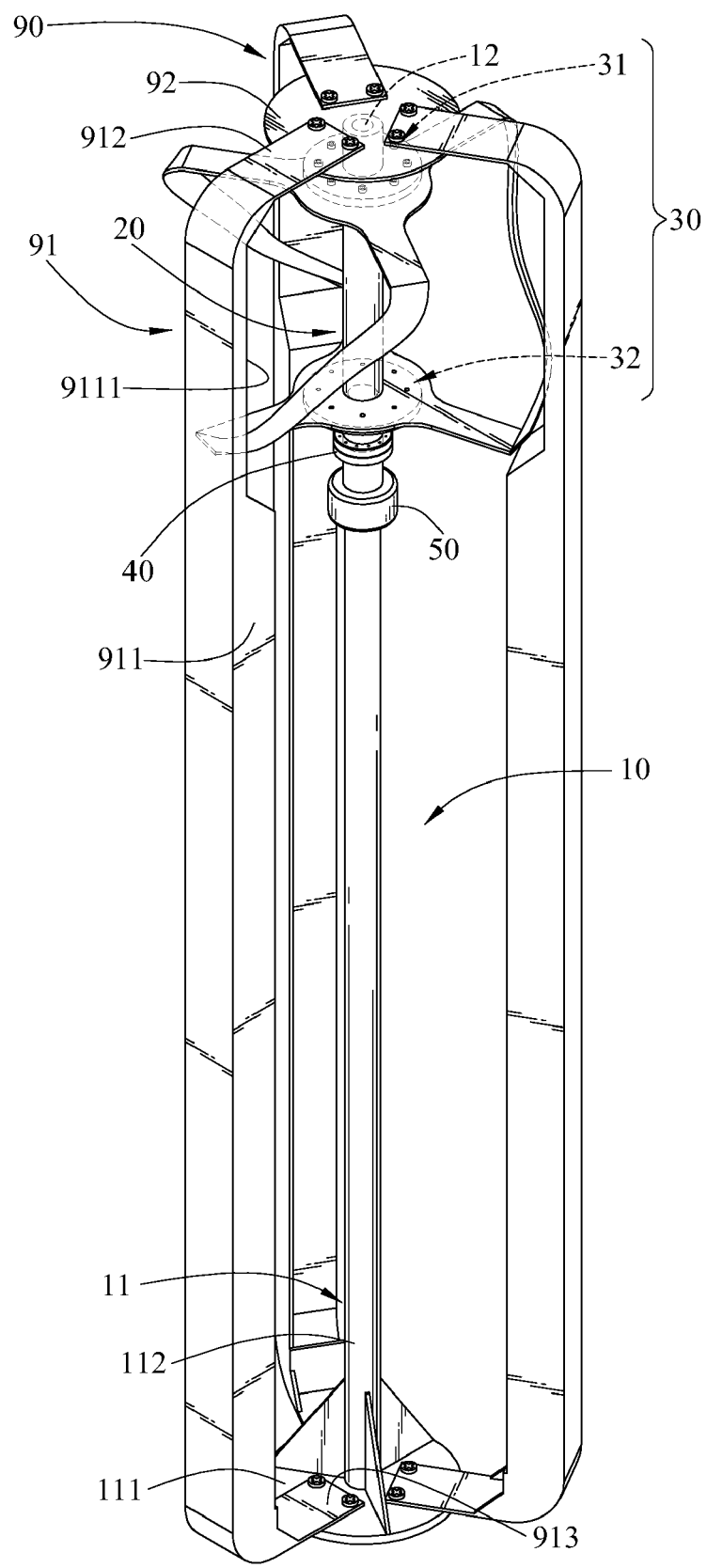

Referring to FIGS. 7A and 7B, a third embodiment of the present invention is shown. The third embodiment according to the present invention is configured to enhance the structural strength depending on the field environment in which the vertical axis wind generator is actually installed. The third embodiment according to the present invention further includes a truss assembly 90, which includes a plurality of trusses 91 and a fastener 92. The trusses 91 include a support portion 911, and an upper fastening portion 912 and a lower fastening portion 913 arranged at and extending horizontally from both ends of the support portion 911. The fastener 92 is arranged at the top end of the shaft lever 12. The upper fastening portion 912 and the lower fastening portion 913 of the truss 91 are respectively fastened to the base 111 and the fastener 92 through a fastening means such as screw and bolt in order to reinforce the overall system strength. A grooving 9111 is arranged in the support portion 911 at a location corresponding to the blade 24, in order to prevent the truss 91 from hindering the blowing air flow.

Figure 8:
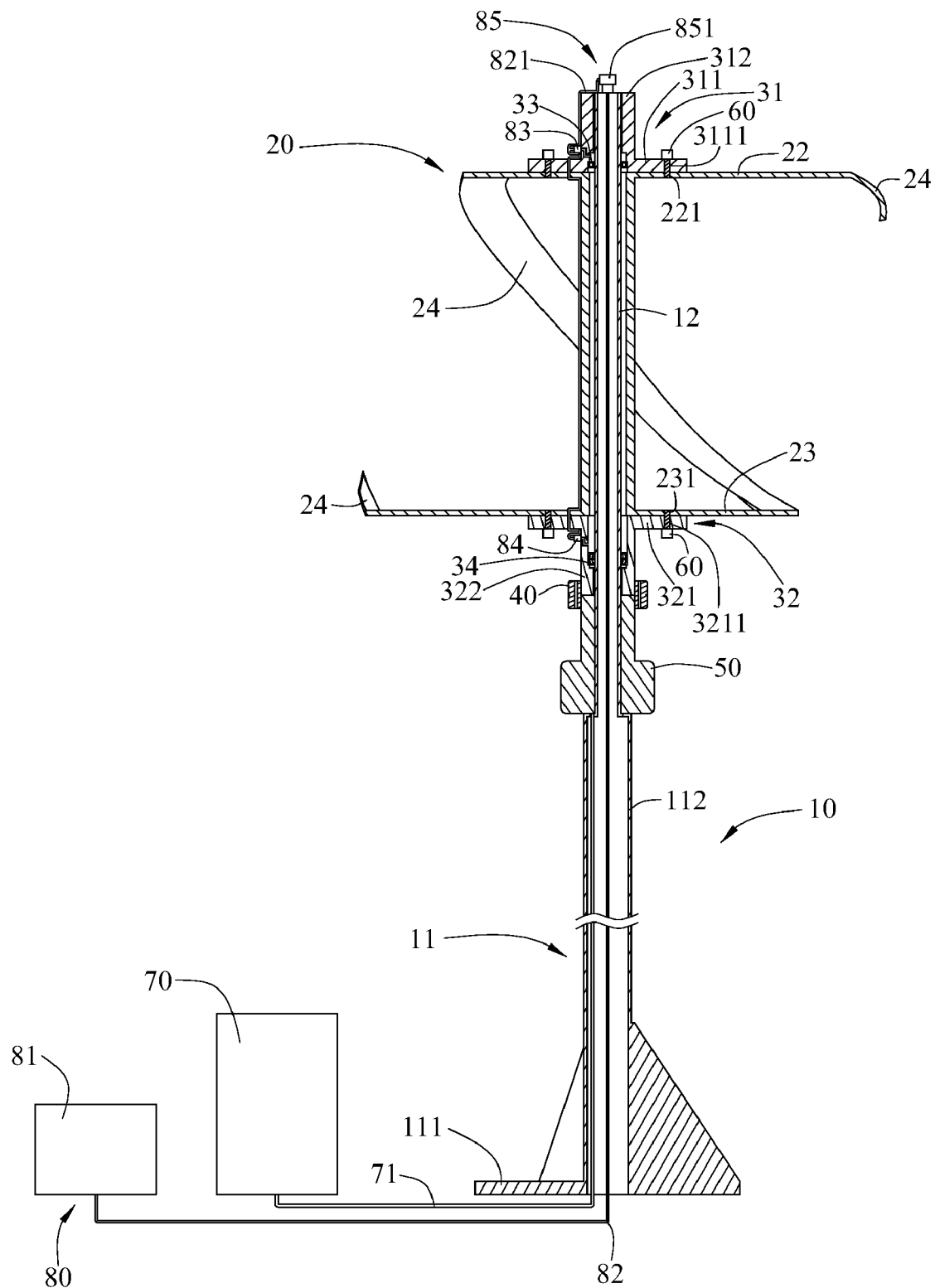
FIG. 8 shows the structure according to a fourth embodiment of the present invention.
Figure 9A:
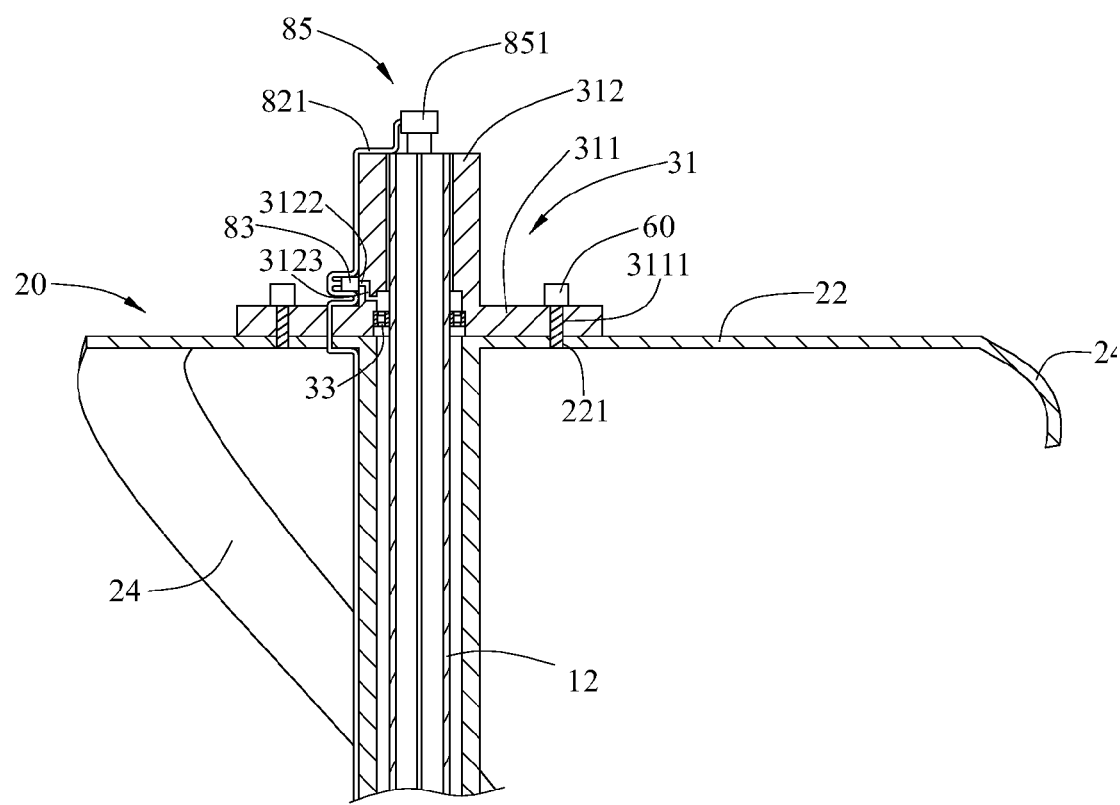
FIGS. 9A and 9B are sectional views of parts of the structure according to the fourth embodiment of the present invention.
Figure 9B:
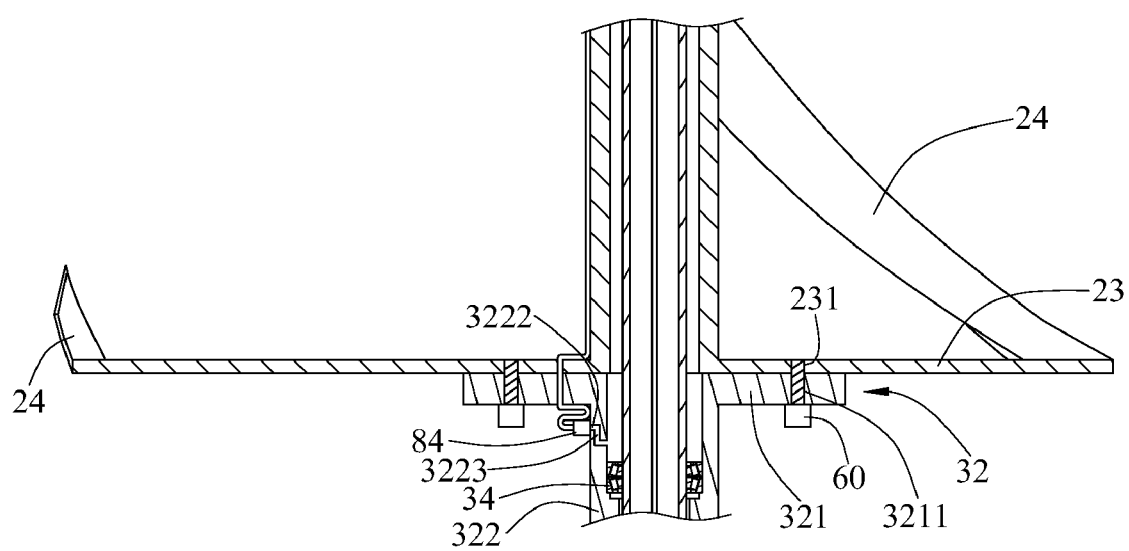

Referring to FIGS. 8, 9A, and 9B, a fourth embodiment of the present invention is shown. The fourth embodiment according to the present invention is derived from the second embodiment. In the fourth embodiment, an upper oil hole 3122 and a lower oil hole 3222 are arranged in the wall face of the bushing 312 and 322 in the bearing assembly 30, and an upper oil way 3123 and a lower oil way 3223 communicating the upper oil hole 3122 and the lower oil hole 3222 with the bearing portion 3121 and 3221 run from the wall face of the bushing 312 and 322. The lubrication assembly 80 further includes a swivel 85 arranged at the top end of the shaft lever 12, which includes a rotation sleeve 851. The oil pipe 82 is connected to the swivel 85 from inside the shaft lever 12. The rotation sleeve 851 is further connected with a supplementary oil pipe 821 from the upper feeding element 83 to the lower feeding element 84. The upper feeding element 83 and the lower feeding element 84 are respectively sleeved on the upper shaft sleeve 31 and the lower shaft sleeve 32 at a location corresponding to the upper oil hole 3122 and the lower oil hole 3222. The supplementary oil pipe 821 rotates together with the upper shaft sleeve 31 and the lower shaft sleeve 32 without interfering with rotation of the blades 24. Of course, based on the technical solution according to the fourth embodiment, the oil pipe may alternatively be arranged outside the shaft lever 12 provided that rotation of the blades 24 is not interfered.

What is claimed is:

1. A vertical axis wind generator structure, comprising:
   a shaft lever;
   a windmill assembly installed to a bearing assembly and rotatably sleeved on the shaft lever with the bearing assembly,
   the bearing assembly comprising
      an upper shaft sleeve arranged at a top end of the windmill assembly and a lower shaft sleeve arranged at a bottom end of the windmill assembly,
      a floating bearing being arranged in the upper shaft sleeve, and
      a fixed bearing being arranged in the lower shaft sleeve,
      the windmill assembly comprising
      a tubular portion sleeved in the shaft lever,
      a top plane arranged at a top end of the tubular portion for joining and fastening the upper shaft sleeve,
      a bottom plane arranged at a bottom end of the tubular portion for joining and fastening the lower shaft sleeve, and
      a plurality of blades connecting the top plane with the bottom plane; and
   a generator connected to the lower shaft sleeve, the windmill assembly being rotated by blowing air flow and thereby the generator being driven by the lower shaft sleeve to be rotated to generate electric energy.

2. The vertical axis wind generator structure according to claim 1, wherein the shaft lever stands upright on a tower.

3. The vertical axis wind generator structure according to claim 1, wherein the floating bearing is a roller bearing.

4. The vertical axis wind generator structure according to claim 1, wherein the fixed bearing is a pair of rolling cone bearings.

5. The vertical axis wind generator structure according to claim 1, wherein the fixed bearing is a pair of angular contact ball bearings.

6. The vertical axis wind generator structure according to claim 1, wherein the lower shaft sleeve and the generator are connected with a shaft coupling.

7. A vertical axis wind generator structure, comprising:
   a shaft lever in which an upper oil inlet and a lower oil inlet are arranged;
   a windmill assembly rotatably sleeved on the shaft lever;
   a bearing assembly comprising an upper shaft sleeve and a lower shaft sleeve, the upper shaft sleeve being installed at a top end of the windmill assembly and being sleeved on the shaft lever at a location corresponding to the upper oil inlet, a floating bearing being arranged in the upper shaft sleeve, the lower shaft sleeve being installed at a bottom end of the windmill assembly and being sleeved on the shaft lever at a location corresponding to the lower oil inlet, and a fixed bearing being arranged in the lower shaft sleeve;
   a generator connected to the lower shaft sleeve, the windmill assembly being rotated by blowing air flow and thereby the generator being drived driven by the lower shaft sleeve to be rotated to generate electric energy; and
   a lubrication assembly comprising:
   an oil tank charged with lubricating oil;
   an upper feeding element install in the upper oil inlet for supplying the lubricating oil to the floating bearing;
   a lower feeding element installed in the lower oil inlet for supplying the lubricating oil to the fixed bearing; and
   an oil pipe arranged in the shaft lever and connecting the oil tank with the upper feeding element and the lower feeding element.

8. The vertical axis wind generator structure according to claim 7, wherein the shaft lever stands upright on a tower.

9. The vertical axis wind generator structure according to claim 7, further comprising an electric box control the lubrication assembly supplying the lubricating oil depending on the working parameters of the generator.

10. The vertical axis wind generator structure according to claim 7, wherein the floating bearing is a roller bearing.

11. The vertical axis wind generator structure according to claim 7, wherein the fixed bearing is a pair of rolling cone bearings.

12. The vertical axis wind generator structure according to claim 7, wherein the fixed bearing is a pair of angular contact ball bearings.

13. A vertical axis wind generator structure, comprising:
a tower on which a shaft lever stands upright;
a windmill assembly installed to a bearing assembly and rotatably sleeved on the shaft lever with the bearing assembly, the bearing assembly comprising an upper shaft sleeve arranged at a top end of the windmill assembly and a lower shaft sleeve arranged at a bottom end of the windmill assembly, a floating bearing being arranged in the upper shaft sleeve, and a fixed bearing being arranged in the lower shaft sleeve;
a generator connected to the lower shaft sleeve, the windmill assembly being rotated by blowing air flow and thereby the generator being dried driven by the lower shaft sleeve to be rotated to generate electric energy; and
a truss assembly comprising a fastener and a plurality of trusses, the fastener being arranged at a top end of the shaft lever and the plurality of trusses being fastened between a bottom end of the tower and the fastener.

14. The vertical axis wind generator structure according to claim 13, where a grooving is arranged in the truss at a location corresponding to the windmill assembly.

15. The vertical axis wind generator structure according to claim 13, wherein the floating bearing is a roller bearing.

16. The vertical axis wind generator structure according to claim 13, wherein the fixed bearing is a pair of rolling cone bearings.

17. The vertical axis wind generator structure according to claim 13, wherein the fixed bearing is a pair of angular contact ball bearings.

18. A vertical axis wind generator structure, comprising:
a shaft lever;
a windmill assembly rotatably sleeved on the shaft lever;
a bearing assembly comprising an upper shaft sleeve and a lower shaft sleeve, the upper shaft sleeve being installed at a top end of the windmill assembly and sleeved on the shaft lever, a floating bearing being arranged in the upper shaft sleeve, an upper oil hole being arranged in the upper shaft sleeve, the lower shaft sleeve being installed at a bottom end of the windmill assembly and sleeved on the shaft lever, a fixed bearing being arranged in the lower shaft sleeve, and a lower oil hole being arranged in the lower shaft sleeve;
a generator connected to the lower shaft sleeve, the windmill assembly being rotated by blowing air blow and thereby the generator being driven by the lower shaft sleeve to be rotated to generate electric energy; and
a lubrication assembly comprising:
an oil tank charged with lubricating oil;
an upper feeding element installed in the upper oil hole for supplying the lubricating oil to the floating bearing;
a lower feeding element installed in the lower oil hole for supplying the lubricating oil to the fixed bearing; and
an oil pipe connected with a bearing movement wheel connecting the upper feeding element and the lower feeding element in combination with a supplementary oil pipe.

19. The vertical axis wind generator structure according to claim 18, wherein the upper shaft sleeve comprises an upper oil way in communication with the upper oil hole and the lower shaft sleeve comprises a lower oil way in communication with the lower oil hole.

20. The vertical axis wind generator structure according to claim 18, wherein the oil pipe is installed inside the shaft lever.

21. The vertical axis wind generator structure according to claim 18, wherein the oil pipe is installed outside the shaft lever.

22. The vertical axis wind generator structure according to claim 18, wherein the floating bearing is a roller bearing.

23. The vertical axis wind generator structure according to claim 18, wherein the fixed bearing is a pair of rolling cone bearings.

24. The vertical axis wind generator structure according to claim 18, wherein the fixed bearing is a pair of angular contact ball bearings.

* * * * *